United States Patent [19]
DeBenedetto et al.

[11] Patent Number: 5,958,241
[45] Date of Patent: Sep. 28, 1999

[54] WASTE TREATMENT AND MINIMIZATION SYSTEM

[75] Inventors: Ronald Peter DeBenedetto, Wilmer; Eugene Porter Leftwich, Mobile, both of Ala.

[73] Assignee: The Louisiana Land & Exploration Co., New Orleans, La.

[21] Appl. No.: 08/517,948

[22] Filed: Aug. 22, 1995

[51] Int. Cl.$^6$ .................................................. C02F 3/34
[52] U.S. Cl. .......................... 210/611; 210/620; 210/626
[58] Field of Search .................................. 210/603, 608, 210/610, 611, 620, 626, 609, 614; 435/874–877

[56] References Cited

U.S. PATENT DOCUMENTS

| | | | |
|---|---|---|---|
| 4,204,958 | 5/1980 | Kaelin | 210/178 |
| 4,236,910 | 12/1980 | Norin | 71/9 |
| 4,288,545 | 9/1981 | Spraker | 210/620 |
| 4,375,412 | 3/1983 | Schimel | 210/603 |
| 4,490,258 | 12/1984 | Heijnen et al. | 210/617 |
| 4,537,682 | 8/1985 | Wong-Chong | 210/626 |
| 4,668,388 | 5/1987 | Dibble et al. | 210/150 |
| 5,141,646 | 8/1992 | Rozich | 210/613 |
| 5,186,837 | 2/1993 | Nikolic et al. | 210/614 |
| 5,207,912 | 5/1993 | Winter et al. | 210/604 |
| 5,232,596 | 8/1993 | Castaldi | 210/603 |
| 5,277,814 | 1/1994 | Winter et al. | 210/604 |
| 5,531,898 | 7/1996 | Wickhom | 210/631 |

OTHER PUBLICATIONS

Oolman, et al., "Refinery Uses Bioslurry Process to Treat RCRA Wastes", Hydrocarbon Processing, Apr. 1996, pp. 72–76.

Oolman, et al., "Full–Scale Bioslurry Treatment of Listed Refinery Wastes", API Refining Environmental Symposium, May 14–15, 1996.

Venkatesh, "Improved Biological Treatment Technology", API Environmental Symposium, May 14–15, 1996.

Preston, et al., "Texaco Gasification Power Systems Refinery Cogeneration, Chemicals Co. Production, and Waste Reduction" No Date.

*Primary Examiner*—Thomas G. Wyse
*Attorney, Agent, or Firm*—Raymond G. Areaux; Lisa Charouel

[57] ABSTRACT

A method and a system for the treatment of organic hazardous wastes from plant waste and associated wastewater treatment processes, whereby the waste is either introduced directly, or continuously separated from wastewater, and routed to a bioreactor, and whereby no organic solids are generated for further offsite disposal. The system disclosed includes a bioreactor, containing selected bacteria, untreated sludges, and recirculated biomass, and a liquid/solid separator allowing water to be utilized elsewhere in the system and returning solids to the bioreactor. The biodegradation process, initiated continuously, converts hazardous organic constituents in waste stream and wastewater sludges from plant operations to inert materials, for extensive periods of operation, without the need for solids removal, external solids treatment or disposal.

23 Claims, 1 Drawing Sheet

WASTE TREATMENT AND MINIMIZATION SYSTEM

BACKGROUND OF THE INVENTION

This invention relates to the processes and systems for the treatment and minimization of waste, and more specifically to a biological treatment unit utilizing a tolerant and effective mixture of cannibalizing microorganisms for the enhanced treatment and degradation of organic wastes to inert levels. The wastes, which are generated from plants, including petroleum oil refineries, petrochemical and chemical processing facilities, municipal wastewater treatment plants and other industrial operations, and from such plant's associated wastewater treatment facilities, are treated in accordance with the novel process and system disclosed herein, resulting in the minimization of such wastes. In particular, use of the invention disclosed herein has generated the unexpected result that little, or no, solids are required to be removed during normal operating conditions.

Under the federal Resource Conservation and Recovery Act, amended by the Hazardous and Solid Waste Amendments of 1984, 42 United States Code 6901 et. seq, (RCRA), and subsequent regulations, 40 Code of Federal Regulations 261 et. seq., all of which are incorporated by reference (the United States Code shall hereunder by referred to as "USC" and the Code of Federal Regulations shall hereunder be referred to as "CFR"), the U.S. Environmental Protection Agency (EPA) identified wastes that would be classified as "hazardous" through either a specific listing ("listed" wastes) or through characteristics of toxicity, corrosivity, ignitability, or reactivity ("characteristic" wastes). For example, Dissolved Air Flotation (DAF) sludge or float, and American Petroleum Institute (API) Separator sludge, by-products of traditional oil refinery wastewater treatment trains, are each "listed" by the EPA as a waste from a specific source, and thus a hazardous waste by definition. See e.g. 40 CFR 261.31 and 261.32, all of which are herein incorporated by reference. Other listed petroleum refining wastes from specific sources include slop oil emulsion solids, heat exchanger bundle cleaning sludge and tank bottoms. Petroleum refinery wastes from non-specific sources include primary (gravitational) oil/water/solids separation sludge and secondary (emulsified) oil/water/solids separation sludges. Id. Dissolved Gas Flotation units are sometimes used instead of DAF units for the same purposes when a non-combustible gas is required for flotation. (For simplicity, the term "DAF", as hereinafter used, shall mean both Dissolved Air Flotation and Dissolved Gas Flotation.)

DAF, API Separator and similar treatment units may also be found in other industrial facilities, such as those producing or utilizing chemicals, petrochemicals, polymers, rubbers, pesticides, oil and gas, hydrocarbon, synthetics or organics. Wastes and discharges from these types of facilities could be listed or otherwise characteristically hazardous, if not listed, and thus likely candidates for waste minimization utilizing the invention disclosed herein.

The EPA identified the "listed" wastes, and by definition classified these wastes as hazardous without the need for ongoing analysis, after conducting detailed industry and process studies involving literature reviews, engineering analyses, surveys and questionnaires, site visits and waste sampling. Such listed wastes include K048, K049, K050, K051, K052, F037 and F038. The EPA places special emphasis on the hazardous constituents contained in specific wastes generated by the particular industry or process studied. See e.g. 55 FR 11798 and 40 CFR 261.11(a) (3), all of which are incorporated by reference. Through the listing process, the EPA engages in assessing information gathered for industries or processes with sufficient similarities in operations, raw materials input, final product configurations, and waste streams, such as the petroleum refining industry. The EPA's listing decisions for petroleum refinery waste streams from specific sources essentially hold that for some of the waste streams, the make-up of hazardous constituents that would likely exist in these streams would be relatively consistent among comparable facilities. Accordingly, the EPA deemed that sufficient information existed to predict that certain streams would usually be hazardous because of the constituents present in the typical streams, and thus the EPA "listed" these wastes. The EPA retained a "delisting" procedure, by which, any operator can prove that their specific waste, which is otherwise "listed," is so different that the specific stream should be taken off of the listed waste category for their stream at their facility. The EPA deals with de-listing requests on a case-by-case basis. Thus in most instances, listed wastes among various facilities, such as petroleum refineries, should be relatively comparable for each listing. For example, one would expect minimal variances between DAF and API Separator sludges at different petroleum oil refineries. These differences should still be minimal even if crude feedstocks or various operations in the refineries vary because the wastes just noted represent the end of the line oils and greases which are usually entrained in the wastewater phase of operations. The entrained or emulsified oil and greases, wash waters, and process area storm waters, which usually flow to the wastewater treatment systems, should not vary much between facilities, crude feed types, or ancillary processes. The EPA is concerned with the overall hazardous nature of all oil/water/separation sludges generated intentionally or incidentally from petroleum refinery and other operations regardless of the type of device used to separate the wastes from the wastewaters and regardless of where the treatment takes place. See e.g. 40 CFR 260.20, 260.22, 42 U.S.C. 6921(f), 55 FR 46354 and "Petitions to Delist Hazardous Waste: A Guidance Manual", 2nd edition, EPA 1993, all of which are incorporated by reference.

Following the Hazardous and Solid Waste Amendments of 1984, the EPA implemented a land disposal ban by promulgating Land Disposal Restrictions (LDRs) for many of the listed wastes, including for example, the DAF and API Separator sludges, effectively prohibiting the land disposal of specific wastes unless specific pretreatment criteria are met. See 40 C.F.R. 268 and 51 F.R. 40572, 52 F.R. 25760, 53 F.R. 31138 and 55 F.R. 22520, all of which are incorporated by reference. The specific pretreatment criteria are referred to as Best Demonstrated Available Technology (BDAT) standards.

The DAF unit and API Separator are commonly used in industry, and particularly the petroleum refining industry, for oil/water/sludge separation. The DAF incorporates mechanical separation of oil materials from water through the introduction of dispersed air. Oil containing sludges are removed and the remaining partially treated water flows onward for additional treatment. The DAF sludges require treatment and disposal as a hazardous waste. The API Separator is typically designed to allow waste-water containing oil and grease to flow by gravity and discharge through a lower outlet. The oil, with a density less than for water, floats on the surface and remains in the separator until removed by skimming or other method. Sludges are also generated from the API Separator, and these must usually be treated and disposed of as a hazardous waste.

In the waste treatment arena, there are several examples of systems which employ alternative approaches to traditional land treatment and methods for treating soils contaminated through years of land disposal/treatment of refinery wastes.

For example, U.S. Pat. No. 5,232,596 by Castaldi, illustrates a Bio-Slurry Reaction System and Process for Hazardous Waste Treatment. Castaldi introduces hydrocarbon contaminated sludges containing soils, requiring dissolving contaminants into an aqueous phase through forming of a slurry with solids and water, which after processing generates solids, including a biodegradation residue which requires further treatment for heavy metals recovery or stabilization and solidification before being sent to a treated waste landfill. Castaldi discloses a liquid/solids separator that partitions the bioreactor series output into three distinct layers, including mixed liquor bioslurry, a biodegraded waste residue, and a liquid decant layer. Also, Castaldi defines the microbiology of the process by disclosing the combined use of genus Pseudomonas in the family Pseudomonadaceae and Acinetobacter in the family Neisseriaceae in the form of activated sludge from petrochemical treatment bioprocesses and cosubstrates to effect at optimal temperatures and required residence times, the biodegradation of hazardous constituents in tarry-oily sludges and soils. Large populations of acclimated organisms are utilized according to Castaldi.

Castaldi also discloses a process and a system requiring a plurality of in-series reactors, with staged introduction of air and mixing, in a closed system which incorporates an off-gas system, including carbon dioxide removal, for recirculating gases generated from the process back to the bioreactors for further reaction and biodegradation of soils. The first stage bioreactor in the series is a waste dissolution reactor operated under anoxic conditions (dissolved oxygen concentration less than 0.5 mg/L). Significantly the following reactor stages are used to taper the load (waste to bacteria ratio) in order to achieve biotreatment. The methods and systems illustrated by Castaldi generate ongoing solids for further external treatment, including processing for heavy metals, and disposal. The waste illustrated for treatment under Castaldi is recovered from previously land farmed or land disposed waste or waste mixed with soils.

T. Oolman, F. J. Castaldi, G. P. Behrens and M. L. Owens of Radian Corporation in Austin, Tex. (hereinafter, "Radian I") published an article in the industry trade journal *Hydrocarbon Processing* entitled, "Biotreat Oily Refinery Waste" which discussed bench-scale treatability and economic feasibility study results and predictions for a tank-based biological treatment process for the treatment of oily refinery wastes. The key components of the process discussed in Radian I include 1) initial recovery of recyclable oil, 2) biological degradation of hazardous organic components, 3) chemical stabilization of metals, and 4) dewatering of the residual sludge. The Radian I authors highlight that pretreatment and post treatment steps are a significant part of the process; that the first step of the process includes oil-water-solids separation by centrifugation or filtration, allowing recovery of valuable product; that degradation of organic components in a bioslurry reactor and metals stabilization follow; and, that residual solids are dewatered and then disposed of off-site.

The Radian I authors note that RCRA BDAT standards are the primary criterion for technology selection and permitting issues are mentioned as factors affecting economic feasibility of an on-site treatment process. The Radian I authors specifically note that treatment of typical refinery sludges to BDAT standards does not imply that a big reduction in waste volume is necessary. Thus, the focus of the process discussed in Radian I is to treat to BDAT standards rather than to reduce solid waste volumes. The Radian I authors base their information on bench-scale treatability studies and the article focuses on technical and economic feasibility issues. The Radian I authors do not disclose information on how to start-up or operate a pilot or a full-scale treatment facility.

According to the Radian I authors, in order to achieve biotreatment, biotreatment assessments must be conducted in order to determine the optimum process configuration and operating conditions, noting from their experience that kinetics of a process and the ultimate fate of compounds may vary substantially with changes in waste characteristics and methods of processing. The Radian I authors do not disclose the bacteria used or any details of the microbiology. The Radian I authors state that they conducted bench scale treatability studies on three waste samples from a Gulf Coast refinery. The wastes referenced in Radian I include slop oil solids (K049), primary sludge (F037) and a mixture of API Separator sludge (K051) and DAF float (K048). The Radian I authors cite degradation of selected hazardous constituents and residual solids requiring further disposal in a RCRA-permitted landfill.

In another issue of *Hydrocarbon Processing*, a one-page Radian Corporation contribution appeared incorporating a comparable to the Radian I process flow diagram, descriptive summary and process economics description for a "bioslurry treatment of oily wastes" process (hereinafter, "Radian II"). Radian II does not disclose the bacteria utilized or any details of the microbiology and, like Radian I, relies on and anticipates land disposal as an integral step in the treatment process.

U.S. Pat. No. 5,271,845 discloses an Aerobic Biological Process for Treating Waste Sludges. This process requires heating of the sludge to induce acclimation of indigenous microbes and the release of extra-cellular enzymes.

U.S. Pat. No. 5,217,616 by Sanyal et al., discloses a Process and Apparatus for Removal of Organic Pollutants From Waste Water. Sanyal et al. discloses fixed or stationary biomass structures, with passages, various shapes and spacings, designed for fluid flow contact with various surfaces.

U.S. Pat. No. 5,286,386 discloses a Solvent Extraction Process for Treatment of Oily Substances, including sludges from petroleum refining operations, incorporating the addition of solvents, surfactants and flocculants, and teaching extraction.

U.S. Pat. No. 4,816,158, a Method for Treating Waste Water from a Catalytic Cracking Unit is disclosed. This process specifically addresses the treatment of a specific waste stream resulting from the catalytic cracking operation conducted in refineries. The treatment process disclosed functions as a batch rather than a continuous process. Also, the times allowed for aeration range between three to six hours and the maximum aeration time cannot exceed twelve hours. Various cycles of the batch operation are conducted intermittently, and solids must be removed.

U.S. Pat. No. 4,874,505 discloses a method for the Recycle of Oily Refinery Waste, effectively routing petroleum refinery sludges to a delayed coker unit where the combustible portions of the sludge are converted to petroleum coke and lower molecular weight liquid products are recovered.

SUMMARY OF THE INVENTION

The present invention is a method and system for treating a plant's organic hazardous wastes and for minimizing the plant's overall organic disposal load. With respect to the typical wastewater treatment facility at a plant, there are generally two applications of the invention: (1) the oil and grease application and (2) the water application.

In the oil and grease application, the invention is a method and an essentially closed-loop system for the treatment of organic hazardous wastes from a plant's waste and associated wastewater treatment processes, including DAF and API Separator sludges, whereby the waste is either introduced directly or continuously separated from wastewater and routed to a bioreactor (hereinafter called the oil and grease bioreactor), which may be a single tank and may be at atmospheric conditions, and whereby, for extended periods, no solids are generated for further offsite disposal. Waste volume is minimized. Selected microorganisms, untreated sludges, and recirculated biomass combine in the oil and grease bioreactor, without the need for pretreatment, in a biodegradation process which continuously converts organic, including, without limitation, hazardous organic, constituents in waste stream and wastewater sludges from plant operations to inert materials, for extensive periods of operation, without the need for solids removal and external solids treatment and disposal. The microorganisms also cannibalize expired microorganisms. Separated water is returned to the existing plant wastewater treatment system for routine processing and discharge. Thus, except for off-gases produced in the process, the process and system are closed-loop. If required because of regulatory requirements or if otherwise desirable, the off-gases could be recovered or otherwise treated by conventional means such as by placing a cover, with a recovery vent, on the bioreactor tank.

The invention would also apply to other organics, including hydrocarbon sludges, chlorinated hydrocarbons, and other organic wastes collected in the plant including the wastewater system.

The water application of the invention applies to a plant's regular biological wastewater treatment system. Under current normal operating methods, biosolids, often called waste activated sludge (WAS) are routinely removed from a bioreactor (hereinafter referred to as the water bioreactor) in order to maintain the proper food to mass ratio (contaminates to microorganisms) or F/M ratio. This typically translates into a volatile suspended solids (VSS) content in the water bioreactor of 2,000 to 4,000 mg/L. In order to maintain this concentration level, WAS must be removed. The wasted sludge is then transferred to some sort of final resting place, i.e. lagoon, sludge pond, digester, etc. and eventually requires dewatering and disposal, either on land or in landfills. Land application is becoming more difficult because of increased regulation.

With the addition of the selected microorganisms to the water bioreactor, WAS or sludge removal is typically reduced by 90% and should in most cases be reduced to zero discharge. By consuming dead bodies of the indicator organisms such as Rotifiers, Nematodes, Stalked Cilitates, etc. the selected microorganisms keep the VSS concentration at a near constant value, thus requiring much less wasting of sludge.

We also predict that the invention would produce benefits for waste sources recovered from previously land farmed materials, stored wastes, and wastes from existing hazardous waste treatment facilities. The biodegradation process of the present invention, which attacks organic constituents found in petroleum refinery wastes and petrochemical and chemical processing waste, are the same as those found in many listed and hazardous wastes from other plants and land disposal sites. While additional accumulation of inorganic solids would be expected from treatment of previously land farmed waste (e.g. sand, dirt, rock, etc.), constant organic solids would continue to be expected, similarly yielding little or no ongoing biomass residue for offsite disposal over extended operating periods.

The present invention utilizes selected microorganisms to degrade the waste. The microorganisms are efficient in degrading the hazardous constituents of organic waste and converting organic solids, including microbial matter, into liquids, liquid solubles and gases. The microorganisms selected essentially are efficient in degrading organic material into water, sugars, carbon dioxide and other metabolic products and are also cannibalistic in that the dead microorganisms are also degraded by the remaining microorganisms. One such microorganism is bacteria belonging to the genus Pseudomonas, such as those identified in U.S. Pat. Nos. 4,452,894, 4,853,334 and 4,910,143, all of which are incorporated by reference.

In carrying out the method of, or in operating the system of, the oil and grease application of the invention, wastewater sludges are routed to the oil and grease bioreactor. Material in the oil and grease bioreactor, consisting of biomass solids, sludge and liquids, flows to a liquids/solids separator wherein the rate of such outflow from the oil and grease bioreactor is essentially equal to the combined rate of inflow to the oil and grease bioreactor of (a) the aforesaid wastewater sludges and (b) concentrated biosolids produced in the liquid/solids separator. Separated liquids produced by the liquid/solid separator are returned to the inlet of the existing wastewater system. The wastewater proceeds for routine treatment (e.g., through the water bioreactor) prior to discharge. The wastewater treatment process continues and additional sludges from the wastewater system are introduced into the oil and grease bioreactor.

Concentrated biosolids produced in the liquid/solids separator are returned to the oil and grease bioreactor for further treatment. Therefore, no solids are removed from the oil and grease bioreactor or any part of the essentially closed-loop system during normal operating conditions.

In carrying out the method of, or in operating the system of, the invention as applied in the water application, wastewater exiting a DAF or similar water treatment unit is routed to the water bioreactor. Material in the water bioreactor consisting of biomass solids, nutrients, and wastewater flows to a clarifier.

Biomass which settles out in the clarifier is returned to the water bioreactor. Therefore, no solids are removed from the water bioreactor or any part of the essentially closed-loop system during normal operating conditions.

An object of this invention is to provide a more cost effective and efficient means and process for treating and disposing of listed and characteristic hazardous wastes prevalent in plants, including, without limitation, petroleum refineries, that heretofore have been dealt with principally through land treatment and, with the advent of land disposal restrictions, incineration and fuels blending. These existing methods have either become restricted by regulation, extraordinarily costly or both. The current climate of waste minimization, source reduction and pollution prevention discourages land disposal options based on policies designed to substantially reduce the generation of hazardous wastes and the likelihood of migration of hazardous constituents from wastes disposed or treated on land so that short-term and long-term threats to human health and the environment are minimized. See e.g. RCRA 42 U.S.C. 6924 (m) (1) and Pollution Prevention Act of 1990, 42 U.S.C. 13101 et seq., all of which are incorporated by reference. The present invention offers a timely solution directly achieving these policies with the added unique benefit of providing overall waste volume reduction/minimization.

Another object of the invention is to overcome the failings of prior art by allowing for operation for extended periods without accumulating a level of solids requiring external solids treatment or disposal. Neither Castaldi, Radian I, nor Radian II disclose or suggest a process or system that does not generate residual solids for off-site disposal during normal operations.

An object of the present invention is to eliminate biomass waste by utilizing microorganisms that consume, and thus minimize or eliminate the accumulation of, spent bacteria residue, microbial carcasses or other microbial matter or debris.

An additional object of the present invention is to maintain a relatively constant amount of solids within the bioreactor system (whether the oil and grease bioreactor, the water bioreactor, or any bioreactor which may be used to treat organic constituents of a waste).

Another object of the oil and grease application of this invention is to operate without regard to residence time. Simplified bioreactor operations, continuous recirculation and constant solids features of the oil and grease application of the invention eliminate the need to consider residence times within the system. In contrast, Castaldi operates under residence time constraints and varies waste to bacteria loads along a series of reactors designed to simulate a batch decay reaction.

Also, the present invention has as its object the conversion of organic, including hydrocarbon, constituents contained in waste streams from plant wastewater treatment operations to inert materials. The biotreatment process converts the constituents of hazardous wastes to a mixture of inert material and biomass, which meets the BDAT standards or similar pretreatment requirements for land disposal.

Another object of this invention is to operate the disclosed treatment facility as part of a plant's wastewater treatment facility, permitted under the Clean Water Act, National Pollutant Discharge Elimination System (NPDES) provisions, 33 USC 1342, which by statute, all of which is incorporated by reference, qualifies the invention for an exemption from RCRA requirements, including permitting, for hazardous waste treatment, storage and disposal. See RCRA at 42 USC 6903(27), all of which is incorporated by reference, where the definition of "solid waste" specifically excludes NPDES permitted industrial discharges. See also 40 CFR 261.4(a)(2), all of which is incorporated by reference. Under the hazardous waste scheme, a hazardous waste must first be a solid waste. 40 CFR 260.10, all of which is incorporated by reference. Under the exemption for NPDES discharges, the water discharges are not solid wastes and thus cannot be hazardous wastes. Moreover, the RCRA requirements for treatment, storage or disposal of hazardous wastes, including permitting, do not apply to a "wastewater treatment unit" defined as "a device which (1) is part of a wastewater treatment facility that is subject to regulation under either section 402 or 307(b) of the Clean Water Act; and (2) receives and treats and stores an influent wastewater that is hazardous waste . . . or that generates and accumulates a wastewater sludge that is hazardous waste . . . or treats or stores a wastewater treatment sludge which is hazardous waste . . . ; and (3) meets the definition of tank or tank system . . . " 40 CFR 260.10, all of which is incorporated by reference. A "tank" is defined as "a stationary device, designed to contain an accumulation of hazardous waste which is constructed primarily of non-earthen materials . . . which provide structural support." Id. and incorporated by reference. A "tank system" is defined as "a hazardous waste storage or treatment tank and its associated ancillary equipment and containment system." Id. and incorporated by reference. This regulatory scheme defines "sludges" as "any solid, semi-solid, or liquid waste generated from a municipal, commercial, or industrial wastewater treatment plant, water supply treatment plant, or air pollution control facility exclusive of treated effluent from a wastewater treatment plant." Id. and incorporated by reference. Wastes removed from NPDES facilities, that are not discharged under the NPDES permit into a water of the United States, however, would not qualify for the exemption. See Comment to 40 CFR 261.4(a) (2), all of which is incorporated by reference.

Similar provisions, definitions and exemptions, variances, exclusions and the like typically exist under state water, hazardous waste and related environmental laws and regulations. Under state-by-state circumstances, the federal EPA delegates authority to the states to administer portions and in some cases all of the environmental programs, after verifying that state laws regulations are substantially consistent with federal requirements and policies. Hereinafter, these state provisions, which are incorporated by reference, are referred to as "state equivalent provisions." Accordingly, this invention has an object achieving exemptions and meeting standards under state equivalent provisions for RCRA and NPDES programs.

Another object of the invention is to minimize the disposal frequency of generated hazardous waste. Without an appropriate permit, generated hazardous waste must, by regulation, be disposed of in less than 90 days from generation. (Under RCRA, generators may accumulate hazardous wastes in RCRA approved containers for up to 90 days without having to obtain a RCRA storage permit. 40 CFR 262.34, all of which is incorporated by reference.)

The present invention also overcomes the limitations of existing technologies by not requiring preliminary separation steps or the forming of a slurry with water. In particular, the present invention utilizes the water content already existing in the wastewater sludge and the biodegradation process of the present invention produces water from the reaction. Moreover, the present invention does not require the addition of surfactants to separate the organics from other solids.

In the case of already land farmed waste or otherwise concentrated solid material lacking sufficient water content, the invention could be adapted by adding a front-end or pretreatment process for forming a slurry, through the addition of water, to the land farmed or concentrated waste and then transferring the slurry to the bioreactor. Thus, we predict that the present invention could be used for treating already land farmed organic materials, stored organic waste and organic wastes from existing hazardous waste treatment facilities.

Another object of the present invention is to improve upon prior art for applications to already land farmed wastes by utilizing the present invention to also minimize ongoing waste generation.

The present invention illustrates treatment accomplishments with only one bioreactor instead of bioreactors in-series, at atmospheric conditions, without any need for heating, without any need for the addition of solvents, and without ongoing production of solids requiring external treatment or disposal. Thus, an object of the present invention is to simplify the process of treating hazardous hydrocarbon containing sludges and to enjoy the operational and maintenance benefits which arise from the simplified process.

Another object of the present invention is to implement a simple biotreatment system without the need to conduct complex biotreatment assessments such as suggested by the Radian I author. The present invention also overcomes existing technology because it does not rely on structural mechanisms for a biological reaction; it does not incorporate the use of a delayed coker or similar combustion unit; it can operate as a batch system or continuous system; and it does not rely on narrow ranges of time for aeration.

DETAILED DESCRIPTION OF THE INVENTION

Figure 1:
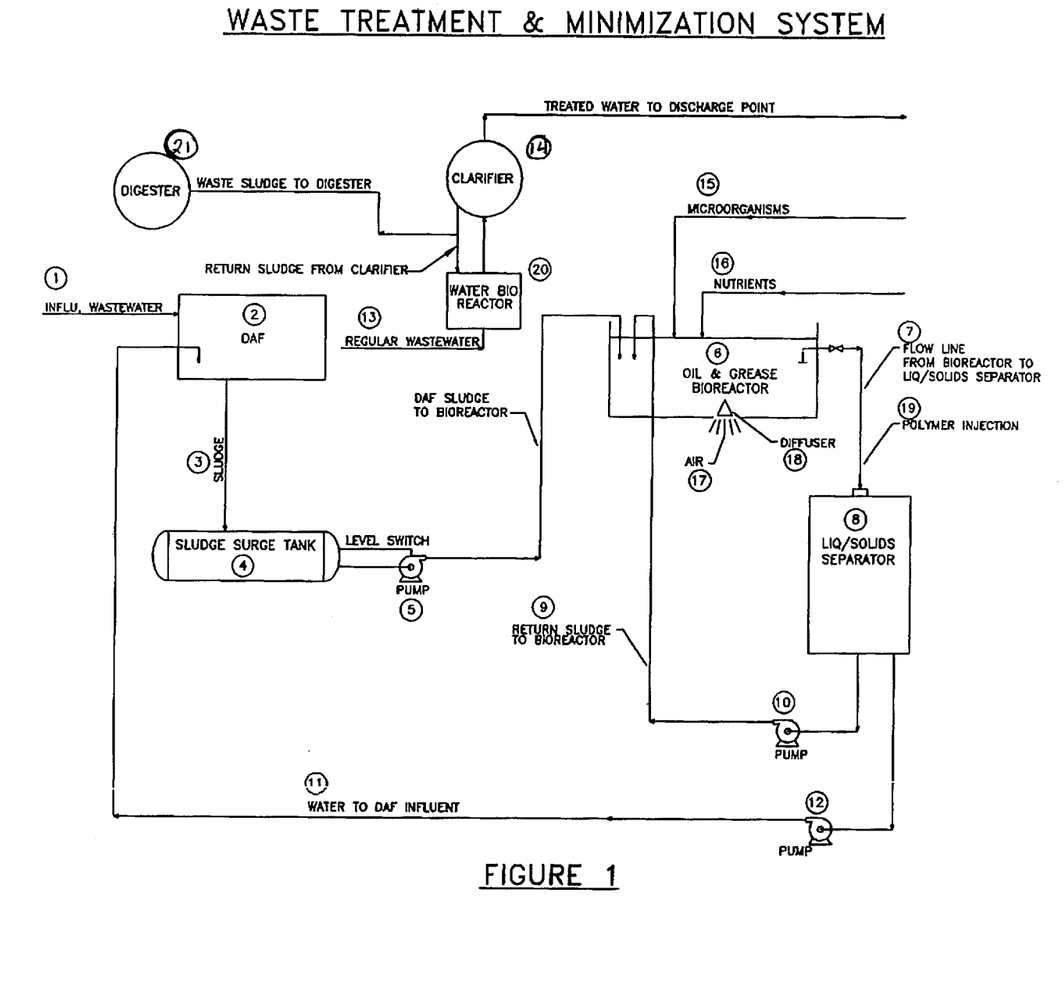
FIG. 1 is a process flow diagram depicting the invention.

Referring to FIG. 1, wastewater 1 from a plant primary wastewater treatment train continuously enters a Dissolved Air Flotation (DAF) Unit 2, a typical unit in a plant wastewater treatment train. DAF sludges 3 from DAF Unit 2 flow to oil and grease bioreactor 6 and, in a most preferred embodiment of the invention, the flow to oil and grease bioreactor 6 is regulated by sludge surge tank 4. A pump 5 may be used to pump the accumulated DAF sludge 3 in surge tank 4 to oil and grease bioreactor 6. Microorganisms 15 are added to oil and grease bioreactor 6.

Microorganisms 15 are selected based upon their propensity to efficiently degrade organic matter, including hydrocarbons, such as aromatics, and other hazardous constituents, to efficiently degrade or cannibalize microbial matter and to efficiently degrade other organic biomass and organic solids into liquids, liquid solubles and gases. In a more preferred embodiment, microorganisms 15 are bacteria with said propensity, and in an even more preferred embodiment, Pseudomonas with said propensity and, in an even still more preferred embodiment, Pseudomonas selected from the group of Pseudomonas identified by reference to the following U.S. Pat. Nos. 4,452,894, 4,853,334 and 4,910,143 (collectively, the "Vandenbergh Patents"). In a most preferred embodiment, the microorganisms 15 added to oil and grease bioreactor 6 are a bacterial mixture, wherein the mixture contains essentially equal concentrations of Pseudomonas identified by each of said Vandenbergh Patents. Nutrients 16 are also added to oil and grease bioreactor 6. Air 17 which includes oxygen is introduced into oil and grease bioreactor 6 via air diffuser 18. Air 17 is introduced into the bottom of oil and grease bioreactor 6 through an air diffuser 18 to maintain aeration and a continuous rolling movement in oil and grease bioreactor 6 for a generally consistent mixture. Other means for mixing, such as mechanical paddles, could be used. Mixing creates a relatively consistent biomass mixture 7 in oil and grease bioreactor 6. Biomass mixture 7 flows from oil and grease bioreactor 6 to the liquid/solids separator 8 at a comparable rate as the combined flow of separated solids 9 from liquid/solids separator 8 and DAF sludges 3 which are introduced into oil and grease bioreactor 6. Flocculent 19, such as a polymer, may be added to biomass mixture 7 as it flows to liquid/solids separator 8 to aggregate solids prior to entering liquid/solids separator 8. Separated solids 9 are returned by pump 10 to oil and grease bioreactor 6 for further treatment. Separated liquid 11 is returned by pump 12 to DAF Unit 2. DAF effluent 13 flows routinely to the typical biological treatment unit existing in the plant wastewater treatment train, water bioreactor 20. Solids may be removed from oil and grease bioreactor 6 after extended periods of operation for dewatering and disposal.

Oil and grease bioreactor 6 must be started-up or primed with DAF sludge 3 and microorganisms 15. DAF sludge 3 and microorganisms 15 may be added to an already activated sludge. However, a time of adjustment and high microorganism mortality rate of the microorganisms already present in the activated sludge should be expected until the activated sludge becomes acclimated to the new food source. Microorganisms 15, if not already present in an approximate concentration equal to the Desired Concentration (as hereinafter defined), should be added in order to obtain and maintain the Desired Concentration.

In a most preferred embodiment of the invention as applied in the oil and grease application, activated sludge is not added to oil and grease bioreactor 6 in order to prime or start-up bioreaction. Instead, oil and grease bioreactor 6 is started up or primed by introducing DAF sludge 3 from DAF Unit 2, microorganisms 15 and nutrients 16. Total suspended solids, volatile suspended solids, oil & grease, pH, nitrogen content, phosphorous content, and temperature are monitored initially and periodically, preferably at least weekly, until such time as the oil and grease is essentially consumed. At such time, the concentration of microorganisms 15 in biomass mixture 7 has reached a concentration which is to be maintained during further operation of oil and grease bioreactor 6. Such concentration is hereinafter referred to for convenience as the Desired Concentration. For approximately 45,000 gallons of DAF sludge 3, essentially total degradation should be realized between day 21 and day 30 of the reaction wherein microorganisms 15 are selected from Pseudomonas identified by said Vandenbergh Patents.

At that time and thereafter, DAF sludge 3 is introduced into oil and grease bioreactor 6. This rate is based on the amount of DAF sludge 3 generated at DAF Unit 2. Significantly, residence time is not a factor in designing the closed-loop system for the oil and grease application of the invention. Except for off-gases and separated liquid, all other materials remain in the closed-loop system and bioreaction proceeds throughout the continuous operation.

Biomass mixture 7 in oil and grease bioreactor 6 should be monitored periodically, and preferably at least every two weeks, and supplemented during continuous operation to maintain microorganisms 15 at the Desired Concentration. Wherein microorganisms 15 are selected from Pseudomonas identified by said Vandenbergh Patents, the Desired Concentration of bacteria cell counts is approximately $1 \times 10^6$/ml. Nitrogen can be added through the addition of urea or ammonia nitrate to keep the excess nitrogen measured as ammonia between 1 and 10 parts per million (ppm). Phosphorous, which is also a necessary nutrient, may already be present in DAF sludge 3 within an acceptable range of between 1.0 and 2.0 ppm. Phosphoric acid may be added to adjust phosphorous levels, if needed. The bioreaction may slow down if phosphorous is not present in at least 1 to 2 ppm. The bioreaction should continue even at phosphorous levels as high as 20 ppm. Adjustments to pH can be made through the addition of acid/base solutions. Also, oxygen or an oxygen substitute is added as well for the proper metabolism of microorganisms 15.

The pH value and levels of nitrogen, phosphorous, total suspended solids, and volatile suspended solids should be monitored periodically and preferably at least twice a week. Because of the air mixing, conditions are relatively consistent throughout oil and grease bioreactor 6. The basic parameters already set forth should be monitored periodically and preferably at least two times per week and adjusted as needed.

In most plants, DAF sludge 3 comes off of DAF Unit 2 intermittently. DAF sludge 3 may be routed directly to oil and grease bioreactor 6. In a more preferred embodiment of the invention, DAF sludge 3 is accumulated in sludge surge tank 4. Sludge surge tank 4 serves to regulate the flow of DAF sludge 3 to oil and grease bioreactor 6. Sludge surge tank 4 also allows DAF sludge 3 to accumulate from DAF unit 2 during periods wherein oil and grease bioreactor 6 is shutdown for maintenance, dewatering of solids or other operational reasons.

In one mode of operation, sludge surge tank 4 is equipped with a level controller. If the level of the accumulated DAF sludge 3 falls below a set level in the sludge surge tank 4, then routing of DAF sludge 3 to oil and grease bioreactor 6 stops. This level control device serves to protect a pump used to transfer DAF sludge 3 to oil and grease bioreactor 6. DAF sludge 3 could also be gravity fed to oil and grease bioreactor 6, either directly from DAF unit 2 or from sludge surge tank 4.

In a most preferred embodiment, liquids/solids separator 8 comprises a screen slanted at approximately 60 degrees, with a profile wire screen having openings of roughly 0.01 inches to separate the liquids from the solids. Biomass mixture 7 flows from oil and grease bioreactor 6 to the top of the screen. The solids generally slide down the screen and are collected for return to oil and grease bioreactor 6 while the liquids flow through the openings. Several other methods for separation could be used such as clarification/settling, flotation/sludge thickening, centrifugation and filtration. Each method works within its limitations, depending on the desired moisture content of the solids. Each separation method could be used with a batch or continuous process.

In a most preferred embodiment of the invention, a high molecular weight, hydrocarbon based, polymer flocculent 19 is added to biomass mixture 7 as it flows to liquid/solids separator 8 to aid in separation. Flocculent 19 is matched to DAF sludge 3 for best results. One such flocculent which works with DAF sludge 3 is a cationic polyacrylamide emulsion used at the rate of 1.0 cc/l of DAF sludge.

Separated liquid 11 continues to flow and is returned to the existing plant wastewater stream for reintroduction into the original DAF Unit 2 where the process continues from the beginning and DAF sludges 3 are introduced into oil and grease bioreactor 6. The wastewater 13 exits DAF Unit 2 for further routine treatment prior to discharge under the existing federal water permit for the plant, as established in the Clean Water Act, National Pollutant Discharge Elimination System (NPDES).

However, in lieu of such routine treatments, the DAF unit wastewater can be treated with this novel invention. The water bioreactor 20 may be loaded with microorganisms 15. The required cell count for the water bioreactor 20 will vary depending on throughput, residence time and organic loading. However, for a typical wastewater facility the usage rate of the selected microorganisms is $3 \times 10^{12}$ total cell count per 1,000,000 gallons of water treated.

The present invention can also be operated on a batch basis. For start-up, untreated DAF sludge 3, microorganisms 15, and nutrients 16 are introduced into oil and grease bioreactor 6 and a continuous air flow 17 is introduced to achieve mixture, consistency and to provide oxygen, all as described hereinabove.

Alternatively, a mechanical mixing could be implemented, such as with paddles. However, oxygen or an oxygen substitute would still need to be introduced into biomass mixture 7. The mixture reacts in oil and grease bioreactor 6 until oil and grease are essentially consumed. For 45,000 gallons of DAF sludge 3, the reaction time is approximately three weeks for microorganisms 15 selected from Pseudomonas identified by said Vandenbergh Patents. During this treatment period, no other DAF sludge 3 is added to oil and grease bioreactor 6. At the end of the treatment period, a flocculent 19, such as a polymer, is added, the air flow 17 is shut-off and solids are allowed to settle. The liquid 11 is pumped off of the top of oil and grease bioreactor 6 and returned to DAF Unit 2. The volume in oil and grease bioreactor 6 should be reduced by approximately 30 percent. The batch process can be restarted by adding fresh DAF sludge 3, which could have been accumulating in sludge surge tank 4, and adding microorganisms 15. The air flow 17 is restarted and the process repeats.

Microorganisms 15 utilized in this process are non-pathogenic microbes, whose diet includes hydrocarbons. In high concentrations, these microorganisms will degrade oil mixed with as little as 5 percent water under ideal conditions. Using a complex metabolic process, these microbes convert organic matter into liquids, liquid solubles and gases, such as water, sugars, carbon dioxide and other non-toxic organic materials suitable for further treatment in a wastewater treatment facility or open waters. It is also believed that the microorganisms 15 also degrade the organic based, polymer flocculent 19 used prior to the liquids/solids separator 8. Upon expiration, the body mass of microorganisms 15 and any other microorganisms become food for the remaining microorganisms 15, thus minimizing the total amount of solids. The remaining active microorganisms 15 consume or cannibalize the expired, or spent, microbial mass. One such microorganism 15 is the genus of bacteria known as Pseudomonas.

In a preferred embodiment of the invention, the microbial mixture is composed of a mixture of Pseudomonas disclosed in said Vandenbergh Patents. In a most preferred embodiment of the invention, the microorganisms 15 are a mixture of equal contributions of Pseudomonas from each of said Vandenbergh Patents resulting in a ⅓ by ⅓ by ⅓ by dry weight mixture of Pseudomonas. The bacteria are grown on malt or bran, freeze dried, and pulverized into solids. Such solids are mixed in the ⅓ each make-up and then rejuvenated through the addition of water in a separate container. Such a dry mixture of Pseudomonas is available from Osprey Biotechnics of Sarasota, Fla., under their Series I product mark. The rejuvenated bacteria are allowed to stand in the container for approximately 24 hours and thereafter are ready, in the oil and grease application, for introduction into oil and grease bioreactor 6 where additional nutrients and organics can be supplied to microorganisms 15 from DAF sludge 3, or in the water application, for introduction into water bioreactor 20 where additional nutrients and organics can be supplied to microorganisms 15 from DAF wastewater 13.

The ideal pH range for operation is between 7.0 and 9.0. However a range of 4.5 to 11 for pH should be acceptable.

Temperatures do not need to be controlled under usual conditions. The bacteria mix 15 can withstand temperatures from freezing to 120 degrees Fahrenheit.

Full-Scale Test and Test Results

Oil and Grease Application

Start-up

A full scale test of the oil and grease application of the invention was conducted at a refinery with an existing 200 gallon per minute Dissolved Air Flotation Unit 2 using a 45,000 gallon square open tank for oil and grease bioreactor 6, a 20 gallon per minute liquid/solids separator 8 and a 2,000 gallon surge tank 4. Air diffuser 18 consisted of 12 bladder-type diffusers arranged in a 3×4 array. A pump 5, activated by a level controller measuring the level of DAF sludge 3 in the sludge surge tank 4, pumped DAF sludge 3 to the top of one corner of oil and grease bioreactor 6 during steady-state operations i.e., after oil and grease bioreactor 6 was primed. An overflow fitting on the opposite corner of oil and grease bioreactor 6 allowed material in oil and grease bioreactor 6 to overflow and then be pumped to liquid/solids separator 8 during steady-state operations. Solids from liquid/solids separator 8 were gravity returned to oil and grease bioreactor 6.

Oil and grease bioreactor 6 was initially charged by loading approximately 45,000 gallons of DAF sludge 3 into oil and grease bioreactor 6. A Pseudomonas blend, sold under the trademark Series I from Osprey Biotechnics of Sarasota, Fla., of approximately equal portions, by dry weight, of three different Pseudomonas identified respectively by U.S. Pat. Nos. 4,452,894, 4,853,334 and 4,910,143 was hydrated, allowed to stand for 24 hours and added to oil and grease bioreactor 6. Approximately 100 gallons of said hydrated microorganisms 15 with $200 \times 10^{12}$ cell count was used to start bioreaction in oil and grease bioreactor 6. Two pounds of ammonia nitrate were added to oil and grease bioreactor 6 as nutrients 16. Phosphorous was not added because DAF sludge 3 already contained approximately 18 ppm of phosphorous. Air 17 was introduced into the bottom of oil and grease bioreactor 6 through the air diffuser 18 to maintain aeration and a continuous rolling movement in oil and grease bioreactor 6 for a consistent mixture and complete mixing throughout oil and grease bioreactor 6. Total suspended solids, volatile suspended solids, oil & grease, pH, nitrogen content, phosphorous content, and temperature were monitored initially and weekly for three to four weeks until the oil and grease was essentially consumed. Essentially total degradation occurred on or around the 24th day after the addition of the microbial mix.

Continuous Operation

After essentially achieving total degradation in oil and grease bioreactor 6, continuous operations were begun. DAF sludge 3 came off of the DAF Unit 2 intermittently, averaging 2 to 3 gallons per minute. DAF sludge 3 accumulated in sludge surge tank 4. During steady-state operations, if the level of the accumulated DAF sludge 3 fell below a level of about 20 percent in the sludge surge tank 4, then routing of DAF sludge 3 to oil and grease bioreactor 6 stopped. Because of a build-up of DAF sludge 3 in sludge surge tank 4, and other tankage not shown, during priming, initial rates of DAF sludge 3 introduction to oil and grease bioreactor 6 were much higher than 2 to 3 gallons per minute while starting the continuous mode of operation.

In order to maintain bacteria cell counts at $1 \times 10^6$/ml, 5 gallons of hydrated bacteria mix 15 with a total cell count of $10 \times 10^{12}$ were added approximately every two weeks.

Results indicated that the microorganisms 15 sustained pH levels at 4.5 and 11 for brief periods. Temperatures were not controlled and the microorganisms 15 sustained temperatures from 65° F. to 118° F.

Samples of DAF sludge 3 were approximately 5 percent oil and grease by weight, total solids content of 7 to 8 percent, with the balance being water. Monitoring results indicated that the process could withstand a wide range of oil content including up to 90 percent.

The level in oil and grease bioreactor 6 remained relatively constant as the overflow biomass mixture 7 flowed from oil and grease bioreactor 6 at about the same rate as the incoming feed combination of DAF sludge 3 and separated solids 9.

The full-scale test produced treatment results as follows:

| DAF Waste EPA (K048 & F038) | Untreated | Treated | EPA Land Treatment Standards |
|---|---|---|---|
| Benzene | 95.1 | <1.0 | 10.0 mg/kg |
| Benzo(a)pyrene | <1.3 | <1.3 | 3.4 |
| bis(2-Ethylhexyl)Phthalate | <1.3 | <1.3 | 28.0 |
| Chrysene | <1.3 | <1.3 | 3.4 |
| Di-n-butyl phthalate | <1.3 | <1.3 | 28.0 |
| Ethylbenzene | 374 | 3.24 | 10.0 |
| Naphthalene | 8.8 | <1.3 | 5.6 |
| Phenanthrene | 5.0 | <1.3 | 5.6 |
| Phenol | 16 | <1.3 | 6.2 |
| Pyrene | <1.3 | <1.3 | 8.2 |
| Toluene | 926 | 5.48 | 10.0 |
| Xylenes, mixed | 2960 | 6.2 | 30.0 |
| Chromium (Total) | <0.1 | <0.1 | 0.86 mg/1 TCLP |
| Cyanides (Total) | <0.1 | <0.1 | 590 |
| Nickel | 0.2 | 0.1 | 5.0 mg/1 TCLP |

From the above, it is obvious that BDAT standards are achieved with this invention.

During the full-scale test, the process was shut down temporarily to remove solids from oil and grease bioreactor 6. The shutdown was scheduled as a convenience rather than a necessity to take advantage of economies of utilizing equipment and service personnel available because of another scheduled maintenance activity at the facility. As shown by the following calculations, on a dry weight basis, only 2.2 percent of the total waste generated over about an eleven month period was shipped offsite. This result is based on an average DAF feed of 2 gpm, at 5 percent solids. The sludge is estimated on a basis of 80 percent water.

Waste Generation Calculations

DAF Waste Generated 2 gallons per minute (gpm) from DAF=2880 gallons (gal)/day×8.5 pounds (lbs)/gal=24,000 lbs/day 24,000 lbs×5% solids=1,200 lbs/day solids (dry wt. basis)×30 days=36,000 lbs/month (mo)

36,000 lbs/mo×11 months=400,000 lbs (dry weight (wt.) basis)=(200 tons of DAF waste/dry wt. basis)

Biomass Mixture Disposed 22 tons sludge including (80% $H_2O$)→8,880 lbs (dry wt. basis)=4.4 tons (dry wt.)

Disposed of 2.2% of waste (dry wt. basis) generated in 11 months (4.4÷200)—2.2%

Accumulated 8,000 lbs (4 tons) in oil and grease bioreactor in 11 months

Dry Weight Basis Summary

1. Generated 200 tons DAF waste in 11 months

2. Disposed of 4.4 tons Biomass Mixture

3. Accumulated 4 tons in oil and grease Bioreactor over 11 month periods 4. 97.8% reduction in sludge disposal requirements.

The DAF sludge 3 generated during the oil and grease bioreactor operation over approximately an eleven month period was approximately 200 tons dry weight basis. Accordingly, the invention reduced dry weight sludge disposal requirements by approximately 98 percent. Moreover, solids were removed from oil and grease bioreactor 6 only once in the approximate eleven month period rather than on an ongoing basis. Accordingly, frequent and costly disposal, typically driven by storage limitations under the traditional RCRA 90-day exemption from permitting for accumulation of hazardous wastes, was eliminated.

During several months of operation, measurements of the pounds of Total Suspended Solids (TSS) and Volatile Suspended Solids (VSS) were measured. The following tables illustrate these data and show that the relative ratio between TSS and VSS remain essentially constant throughout the operational period for which data was recorded.

This invention, in the oil and grease application, has produced significant savings in dewatering and disposal of wastes, while providing for effective alternatives to existing waste treatment and disposal options. For example, in the year before the year of the full-scale test, incurred costs at the test facility exceeded $330,000 for dewatering and disposal for approximately 134 tons of DAF solids. Under current regulations and without the present invention, alternative disposal options of incineration or fuels blending exist at costs exceeding the dewatering and disposal costs just listed by approximately $1,000 per ton, or an additional $134,000. Without the present invention, a potential waste disposal burden exists for the DAF sludge of approximately $464,000 per year. The present invention eliminates the incremental dewatering and disposal costs and achieves treatment of approximately 700 pounds per day of solids and 1000 pounds per day of oil and grease. The cost savings in disposal alone approached $500,000 for the eleven month operational period discussed above. While the present invention requires costs for equipment, materials, and operation, these costs are relatively modest and the savings potential and the waste minimization benefits are extraordinary.

In the following table, "DO" means dissolved oxygen, "NH3" means ammonia, "TSS" means total suspended solids, "VSS" volatile suspended solids, "O&G" means oil and grease and the symbol "#" means total pounds on a dry weight basis. Day 1 is not the actual first day that the system was operated but rather a date shortly after the start of continuous operations.

DAF BIOLOGICAL TREATABILITY STUDY

| DATE | pH | DO | NH3 | TSS mg/l | VSS mg/l | O & G mg/l | TSS # | VSS # |
|---|---|---|---|---|---|---|---|---|
| Day 1 | 7.62 | 0.20 | 29 | 29010 | 21290 | 12670 | 10154 | 7452 |
| Day 3 | 7.62 | 0.34 | 21 | 28950 | 21630 | 13010 | 10133 | 7571 |
| Day 6 | 7.30 | 0.20 | 0.8 | 29240 | 22900 | 7660 | 10234 | 8015 |
| Day 8 | 7.36 | 0.18 | 8.3 | 30270 | 21770 | 770 | 10595 | 7620 |
| Day 10 | 7.33 | 0.39 | 4.1 | 40150 | 32070 | 1150 | 14053 | 11225 |
| Day 13 | 7.01 | 0.18 | 19.2 | 41160 | 32950 | 7100 | 14406 | 11533 |
| Day 15 | 6.91 | 0.13 | 11.8 | 27310 | 19670 | 7480 | 9559 | 6885 |
| Day 17 | 7.01 | 0.25 | 0.56 | 29580 | 20470 | 6450 | 10353 | 7165 |
| Day 20 | 6.85 | 0.45 | 0.34 | 28000 | 20620 | 400 | 9800 | 7217 |
| Day 22 | 7.53 | 0.31 | 61 | 24190 | 17890 | 430 | 8467 | 6262 |
| Day 24 | 7.19 | 0.06 | 65 | 23970 | 17100 | 2260 | 8390 | 5985 |
| Day 27 | 6.90 | 0.10 | 87.1 | 23370 | 16910 | 700 | 8180 | 5919 |
| Day 29 | 6.94 | 0.01 | 115 | 27560 | 20140 | 4540 | 9646 | 7049 |
| Day 31 | 7.17 | 0.01 | 1.07 | 29670 | 22150 | 12160 | 10385 | 7753 |
| Day 34 | 6.87 | 0.02 | 0.55 | 27040 | 19460 | 1610 | 9464 | 6811 |
| Day 42 | 6.84 | 0.08 | 1.7 | 29340 | 21380 | 1690 | 10269 | 7483 |
| Day 44 | 6.95 | 0.06 | 3.4 | 32710 | 24470 | 2720 | 11449 | 8565 |
| Day 49 | 7.03 | 0.01 | 17.3 | 28930 | 21278 | 4120 | 10126 | 7447 |
| Day 62 | 7.14 | 0.01 | 19.8 | 36140 | 26760 | 5850 | 12649 | 9366 |
| Day 66 | 7.16 | 0.01 | 0.62 | 63950 | 51910 | 11020 | 22383 | 18169 |
| Day 69 | 7.00 | 0.01 | 0.23 | 39120 | 28570 | 18050 | 13692 | 10000 |
| Day 71 | 7.50 | 0.01 | 0.79 | 33880 | 24170 | 14860 | 11858 | 8460 |
| Day 77 | 6.98 | 0.01 | 0.56 | 35460 | 26110 | 122650 | 12411 | 9139 |
| Day 79 | 7.14 | 0.01 | 0.91 | 42470 | 32360 | 10710 | 14865 | 11326 |
| Day 84 | 6.70 | 0.01 | 0.6 | 44370 | 34140 | 88110 | 15530 | 11949 |
| Day 94 | 6.71 | 0.01 | 0.1 | 43460 | 33630 | 3920 | 15211 | 11771 |
| Day 97 | 6.38 | 0.01 | 0.8 | 37260 | 27880 | 2110 | 13041 | 9758 |
| Day 105 | 6.72 | 0.01 | 1.1 | 36000 | 26920 | 2328 | 12600 | 9422 |
| Day 107 | 6.45 | 0.01 | 0.6 | 33440 | 24910 | 10610 | 11704 | 8719 |
| Day 112 | 6.54 | 0.01 | 0.64 | 51600 | 42420 | 450 | 18060 | 14847 |
| Day 114 | 6.53 | 0.01 | 0.3 | 35330 | 26980 | 2270 | 12366 | 8443 |
| Day 126 | 7.61 | 0.01 | 101.4 | 52670 | 42600 | 3960 | 18435 | 14910 |
| Day 128 | 7.4 | 0.01 | 84.5 | 50560 | 38550 |  | 17696 | 13493 |
| Day 135 | 7.1 | 0.01 | 34.4 | 61970 | 49750 | 12570 | 21690 | 17413 |
| Day 143 | 7.3 | 0.01 | 0.53 | 68620 | 57070 |  | 24017 | 19975 |
| Day 147 | 6.96 | 0.01 | 0.32 | 47200 | 36040 | 12850 | 16520 | 12614 |
| Day 149 | 7.01 | 0.01 | 1.39 | 35820 | 25640 | 9090 | 12537 | 8974 |
| Day 154 | 7.1 | 0.01 | 0.4 | 38440 | 29790 | 8000 | 13454 | 10427 |
| Day 212 | 7.48 | 0.01 | 374 | 41380 | 28580 | 20590 | 14483 | 10003 |
| Day 224 | 7.51 | 0.01 | 307 | 39760 | 27640 | 23180 | 13916 | 9674 |
| Day 226 | 7.54 | 0.01 | 240 | 44360 | 31160 | 16190 | 15526 | 10906 |
| Day 231 | 7.51 | 0.01 | 185 | 44020 | 31040 | 21410 | 15407 | 10964 |
| Day 238 | 7.22 | 0.01 | 150 | 52530 | 40280 | 7450 | 18386 | 14098 |
| Day 240 | 7.28 | 0.01 | 130 | 51860 | 40050 | 1298 | 18151 | 14018 |
| Day 245 | 7.25 | 0.01 | 134 | 39700 | 29740 | 4470 | 13895 | 10409 |
| Day 247 | 7.45 | 0.01 | 127 | 42700 | 32570 | 3510 | 14945 | 11400 |
| Day 266 | 8.01 | 0.01 | 213 | 57770 | 43260 | 13680 | 20220 | 15141 |

-continued

| DATE | pH | DO | NH3 | TSS mg/l | VSS mg/l | O & G mg/l | TSS # | VSS # |
|---|---|---|---|---|---|---|---|---|
| Day 268 | 7.89 | 0.01 | 180 | 58000 | 43390 | 12900 | 20300 | 15187 |
| Day 275 | 7.81 | 0.01 | 164 | 52170 | 38310 | 2710 | 18260 | 13409 |
| Day 280 | 7.7 | 0.01 | 149 | 56700 | 42780 | 13500 | 19845 | 14973 |
| Day 282 | 7.65 | 0.01 | 155 | 61400 | 46920 | 15700 | 21490 | 16422 |
| Day 287 | 7.56 | 0.01 | 121 | 52990 | 38910 | 1840 | 18547 | 13619 |
| Day 289 | 7.44 | 0.01 | 117 | 54320 | 40160 | 24680 | 19012 | 14056 |

Full-Scale Test and Test Results

Water Application

A full scale test of the water application of the invention was conducted at a refinery with an existing 200,000 gallon per day wastewater treatment system. Water bioreactor 20 was an approximately 140,000 gallon tank with 36 bladder-type air diffusers. Wastewater from the refinery entered DAF unit 2 and wastewater 13 exited DAF unit 2 for further treatment in water bioreactor 20. Wastewater biomass mixture flowed from water bioreactor 20 to clarifier 14. Solids from clarifier 14 were returned to water bioreactor 20 for further treatment and treated water was discharged from clarifier 14.

Prior to the start of the test, biomass in water bioreactor 20 was periodically removed from water bioreactor 20 and transported to digester 21 for further treatment and disposal.

A Pseudomonas blend, sold under the trademark Series I from Osprey Biotechnics of Sarasota, Fla., of approximately equal portions, by dry weight, of three different Pseudomonas identified respectively by said Vandenbergh Patents were hydrated, allowed to stand for 24 hours and added to water bioreactor 20. Approximately 5 gallons of said hydrated microorganisms 15 with $10 \times 10^{12}$ cell count were added each week over an approximate three month period. At this rate, zero discharge of WAS was experienced over the last two months of said three month period. Solids concentrations had decreased to the point where solids were no longer required to be removed to digester 21.

What is claimed is:

1. A closed-loop continuous process for treating sludge produced in a plant on a continuous or intermittent basis over an extended period, wherein said produced sludge contains organic waste and solid waste, including organic solid waste and wherein said organic waste of said produced sludge contains organic hazardous constituents, comprising the steps of:
   a. maintaining a bioreaction with selected microorganisms in a biomass mixture to which said produced sludge is added over said extended period wherein said selected microorganisms continuously degrade said organic waste of said produced sludge while said organic waste is a part of said biomass mixture and wherein said bioreaction produces spent microbial mass;
   b. continuously degrading said spent microbial mass with said selected microorganisms while said spent microbial mass is a part of said biomass mixture;
   c. mixing said biomass mixture;
   d. removing a quantity of said biomass mixture;
   e. separating all of said removed quantity of said biomass mixture into liquids and solids of a desired moisture content;
   f. returning all of said separated solids to said biomass mixture for further degradation;
   g. maintaining a relatively constant volume of said biomass mixture while repeating steps (a) through (f) over said extended period whereby, for said extended period, no solids are removed from said closed-loop continuous process except as degraded in steps (a) and (b) with said selected microorganisms.

2. The process of claim 1 wherein said microorganisms are from the genus Pseudomonas.

3. The process of claim 2 wherein said Pseudomonas are comprised of the following three types of Pseudomonas (a) Pseudomonas selected from the group consisting of *Pseudomonas putida* (NRRL-B-12,537), Pseudomonas sp. (NRRL-B-12,538), Pseudomonas sp. (NRRL-B-12,539) and *Pseudomonas aeruginosa* (NRRL-B-12,536); (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count.

4. The process of claim 2 wherein said Pseudomonas are mixed in equal portions from each of the following three types of Pseudomonas (a) Pseudomonas selected from the group consisting of *Pseudomonas putida* (NRRL-B-12,537), Pseudomonas sp. (NRRL-B-12,538), Pseudomonas sp. (NRRL-B-12,539) and *Pseudomonas aeruginosa* (NRRL-B-12,536); (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count.

5. The process of claim 2 wherein said Pseudomonas are mixed in equal portions from each of the following three types of Pseudomonas (a) a bacterium of the genus Pseudomonas in a containing genetic material which promotes utilization of a wide variety of halogenated hydrocarbons as sole carbon sources and wherein the strain grows faster in the presence of o-, m- or p-chlorotoluene than toluene as a sole carbon source, the genetic material being isolatable from a strain of *Pseudomonas putida* or Pseudomonas sp. (NRRL-B-12,538) or (NRRL-B-12,539) in contact for extended periods of time with halogenated aromatic compounds first by growth in a minimal medium including L-tryptophan as a sole carbon source and then growth in a second minimal medium in the presence of a halogenated aromatic compound as a second sole carbon source and wherein growth of the bacterium is determined using a minimal medium agar plate in the presence of vapors of toluene or o-, m- or p-chlorotoluene as a sole carbon source at 25° to 30° C.; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count.

6. The process of claim 5 wherein said containing genetic material is selected from the group consisting of genetic material that is a plasmid in *Pseudomonas putida* (NRRL-B-12,537), genetic material in Pseudomonas sp. (NRRL-B-12,538), genetic material in Pseudomonas sp. (NRRL-B-12,539) and genetic material in *Pseudomonas aeruginosa* (NRRL-B-12,536).

7. The process of claim 2 wherein said Pseudomonas are mixed in equal portions from each of the following three types of Pseudomonas (a) a bacterium of the genus Pseudomonas in a containing genetic material which encodes for halogenated aromatic compound degradation and in particular grows faster in the presence of o-, m- or p-chlorotoluene than toluene as a sole carbon source and which is derived from a Pseudomonas isolated from soil, wherein the isolated Pseudomonas has been in contact with a halogenated hydrocarbon lubricant in the soil for extended periods of time adjacent to an oil well and wherein growth of the bacterium is determined using a minimal medium agar plate in the presence of vapors of toluene or o-, m- or p-chlorotoluene as a sole carbon source at 25° to 30° C.; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count.

8. The process of claim 2 wherein said extended period is eleven months.

9. The process of claim 2 wherein said extended period is ninety days.

10. The process of claim 2 wherein said extended period is one month.

11. The process of claim 2 wherein said extended period is three weeks.

12. The process of claim 2 wherein the total solid waste, on a dry-weight basis, of said biomass mixture at the expiration of said extended period is less than the total amount, on a dry-weight basis, of said solid waste of said produced sludge added to said biomass mixture during said extended period.

13. The process of claim 12 wherein said total solid waste is 97% less than said total amount, on a dry-weight basis, of said solid waste of said produced sludge added to said biomass mixture during said extended period.

14. The process of claim 12 wherein said total solid waste is 30% less than said total amount, on a dry-weight basis, of said solid waste of said produced sludge added to said biomass mixture during said extended period.

15. The process of claim 2 wherein a relatively constant amount of solid waste is maintained in the biomass mixture.

16. The process of claim 2 wherein the ratio of volatile suspended solids to total suspended solids in said biomass mixture remains relatively constant.

17. The process of claim 2 including the step of processing all of said separated liquids to the extent necessary to remove any remaining sludge in said separated liquids and combining said removed remaining sludge with said produced sludge.

18. A closed-loop continuous process for treating sludge produced in a plant on a continuous or intermittent basis over an extended period, wherein said produced sludge contains organic waste and solid waste, including organic solid waste and wherein said organic waste of said produced sludge contains organic hazardous constituents, comprising the steps of:

a. maintaining a bioreaction with selected microorganisms in a biomass mixture to which said produced sludge is added over said extended period wherein said selected microorganisms continuously degrade said organic waste of said produced sludge while said organic waste is a part of said biomass mixture and wherein said bioreaction produces spent microbial mass;

b. continuously degrading said spent microbial mass with said selected microorganisms while said spent microbial mass is a part of said biomass mixture;

c. mixing said biomass mixture;

d. removing a quantity of said biomass mixture;

e. separating all of said removed quantity of said biomass mixture into liquids and solids of a desired moisture content;

f. returning all of said separated solids to said biomass mixture for further degradation;

g. maintaining a relatively constant volume of said biomass mixture while repeating steps (a) through (f) over said extended period without the need for removing solids from said closed-loop continuous process.

19. The process of claim 18 wherein said microorganisms are from the genus Pseudomonas.

20. The process of claim 19 wherein said Pseudomonas are comprised of the following three types of Pseudomonas (a) Pseudomonas selected from the group consisting of *Pseudomonas putida* (NRRL-B-12,537), Pseudomonas sp. (NRRL-B-12,538), Pseudomonas sp. (NRRL-B-12,539) and *Pseudomonas aeruginosa* (NRRL-B-12,536); (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count.

21. The process of claim 19 wherein said extended period is eleven months.

22. The process of claim 19 wherein said extended period is three weeks.

23. The process of claim 19 wherein the total solid waste, on a dry-weight basis, of said biomass mixture at the expiration of said extended period is less than the total amount, on a dry-weight basis, of said solid waste of said produced sludge added to said biomass mixture during said extended period.

* * * * *

UNITED STATES PATENT AND TRADEMARK OFFICE
CERTIFICATE OF CORRECTION

PATENT NO. : 5,958,241
DATED : September 28, 1999
INVENTOR(S) : DeBenedetto et al.

It is certified that error appears in the above-identified patent and that said Letters Patent is hereby corrected as shown below:

Column 3,
Line 56, "port treatment" should read -- post-treatment --;
Line 57, "oil-water-solids" should read -- oil/water/solids --.

Column 4,
Lines 44 and 45, the space between "5,286,386" and "discloses" should be deleted.

Column 6,
After line 19, the following paragraph should be inserted: -- U.S. Patent No. 4,452,894 discloses a bacterium of the genus *Pseudomonas* in a containing genetic material which promotes utilization of a wide variety of halogenated hydrocarbons as sole carbon sources and wherein the strain grows faster in the presence of o-, — or p-chlorotoluene thant toluene as a sole carbon source, the genetic material being isolatable from a strain of *Pseudomonas putida or Pseudomonas sp.* (NRRL-B-12,538) or (NRRL-B-12,539) in contact for extended periods of time with halogenated aromatic compounds first by growth in a minimal medium including L-tryptophan as a sole carbon source and then growth in a second minimal medium in the presence of a halogenated aromatic compound as a second sole carbon source and wherein growth of the bacterium is determined using a minimal medium agar plate in the presence of vapors of toluene or o-, — or p-chlorotoluene as a sole carbon source at 25° to 30°C. U.S. Patent No. 4,452,894 also discloses a bacterium wherein said genetic material may be a plasmid in *Pseudomonas putida* (NRRL-B-12,537), or wherein said genetic material may be in *Pseudomonas sp.* (NRRL-B-12,538), in *Pseudomonas sp.*(NRRL-B-12,539) or in *Pseudomonas aeruginosa* (NRRL-B-12,536). U.S. Patent No. 4,452,894 further discloses a bacterium of the genus *Pseudomonas* containing genetic material which encodes for halogenated aromatic compound degradation and in particular grows faster in the presence of o-, — or p-chlorotoluene than toluene as a sole carbon source and which is derived from a *Pseudomonas* isolated from soil, wherein the isolated *Pseudomonas* has been in contact with a halogenated hydrocarbon lubricant in the soil for extended periods of time adjacent to an oil well and wherein growth of the bacterium is determined using a minimal medium agar plate in the presence of vapors of toluene or o-, — or p-chlorotoluene as a sole carbon source at 25° to 30°C. Additionally, U.S. Patent No. 4,452,894 discloses *Pseudomonas putida* (NRRL-B-12,537), *Pseudomonas sp.* (NRRL-B-12,538), *Pseudomonas sp.*(NRRL-B-12,539) and *Pseudomonas aeruginosa* (NRRL-B-12,536). All of the *Pseudomonas* disclosed in U.S. Patent No. 4,452,894 are hereinafter referred to as the "894 *Pseudomonas*" for clarity. U.S. Patent No. 4,853,334 discloses a process for degrading volatile halogenated aliphatic hydrocarbons containing 1 to 3 carbon atoms using *Pseudomonas fluorescens* (NRRL-B-18,296). U.S. Patent No. 4,910,143 discloses a bacterial method and compositions for degrading hydrocarbons using a mixture of *Pseudomonas putida* (NRRL-B-18,117) and *Pseudomonas putida* (NRRL-B-18,118) at a ratio of 1:100 to 100:1 by cell count. --.

UNITED STATES PATENT AND TRADEMARK OFFICE
CERTIFICATE OF CORRECTION

PATENT NO.   : 5,958,241
DATED        : September 28, 1999
INVENTOR(S)  : DeBenedetto et al.

Page 2 of 3

It is certified that error appears in the above-identified patent and that said Letters Patent is hereby corrected as shown below:

Column 9,
Lines 9 and 10, "group of Pseudomonas identified by reference to the following" should read -- group of (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count, such *Pseudomonas* identified respectively in the following --;
Line 49, "concentrations of Pseudomonas" should read -- concentrations of the following *Pseudomonas* (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as Pseudomonas --.

Column 10,
Line 35 and 36, "microoraganisms 15 are selected from Pseudomonas identified by"" should read -- microorganisms 15 are Pseudomonas from (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified by --
Lines 49 and 50, "selected from Pseudomonas identified by" should read -- selected from (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified by --

Column 12,
Line 10, "from Pseudomonas identified by" should read -- from (a) '894 *Pseudomonas* (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified by --;
Line 41, "mixture of Pseudomonas disclosed" should read -- mixture of the following Pseudomonas (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as disclosed --;
Line 44, "each of said" should read -- each of (a) '894 *Pseudomonas* (b) *Pseudomonas fluorescens* (NRRL-B-18,296) and a mixture of *Pseudomonas putida* (NRRL-B-18,117) and (c) *Pseudomonas putida* (NRRL-B-18,118) at a ratio of 1:100 to 100:1 by cell count as disclosed in said --.

UNITED STATES PATENT AND TRADEMARK OFFICE
CERTIFICATE OF CORRECTION

PATENT NO. : 5,958,241
DATED : September 28, 1999
INVENTOR(S) : DeBenedetto et al.

It is certified that error appears in the above-identified patent and that said Letters Patent is hereby corrected as shown below:

Column 16,
Line 17, "solids, "VSS" volatile" should read -- solids, "VSS" means volatile --.
Line 34, "0.34" should read -- 0.84 --;
Line 66, "16190" should read -- 16890 --.

Column 17,
Lines 31 and 32, "weight, of three different Pseudomonas identified" should read -- weight, of the following different *Pseudomonas* (a) '894 *Pseudomonas*; (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified --.

Signed and Sealed this

Twenty-fifth Day of December, 2001

*Attest:*

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO.   : 5,958,241
DATED        : September 28, 1999
INVENTOR(S)  : DeBenedetto et al.

It is certified that error appears in the above-identified patent and that said Letters Patent is hereby corrected as shown below:

Column 3,
Line 56, "post treatment" should read -- post-treatment --;
Lines 57 and 57, "oil-water-solids" should read -- oil/water/solids --.

Column 4,
Lines 44 and 45, the space between "5,286,386" and "discloses" should be deleted.

Column 6,
After line 19, the following paragraph should be inserted: -- U.S. Patent No. 4,452,894 discloses a bacterium of the genus *Pseudomonas* in a containing genetic material which promotes utilization of a wide variety of halogenated hydrocarbons as sole carbon sources and wherein the strain grows faster in the presence of o-, – or p-chlorotoluene than toluene as a sole carbon source, the genetic material being isolatable from a strain of *Pseudomonas putida* or *Pseudomonas sp.* (NRRL-B-12,538) or (NRRL-B-12,539) in contact for extended periods of time with halogenated aromatic compounds first by growth in a minimal medium including L-tryptophan as a sole carbon source and then growth in a second minimal medium in the presence of a halogenated aromatic compound as a second sole carbon source and wherein growth of the bacterium is determined using a minimal medium agar plate in the presence of vapors of toluene or o-, – or p-chlorotoluene as a sole carbon source at 25° to 30°C. U.S. Patent No. 4,452,894 also discloses a bacterium wherein said genetic material may be a plasmid in *Pseudomonas putida* (NRRL-B-12,537), or wherein said genetic material may be in *Pseudomonas sp.* (NRRL-B-12,538), in *Pseudomonas sp.* (NRRL-B-12,539) or in *Pseudomonas aeruginosa* (NRRL-B-12,536). U.S. Patent No. 4,452,894 further discloses a bacterium of the genus *Pseudomonas* containing genetic material which encodes for halogenated aromatic compound degradation and in particular grows faster in the presence of o-, – or p-chlorotoluene than toluene as a sole carbon source and which is derived from a *Pseudomonas* isolated from soil, wherein the isolated *Pseudomonas* has been in contact with a halogenated hydrocarbon lubricant in the soil for extended periods of time adjacent to an oil well and wherein growth of the bacterium is determined using a minimal medium agar plate in the presence of vapors of toluene or o-, – or p-chlorotoluene as a sole carbon source at $25^{\underline{o}}$ to $30^{\underline{o}}$C. Additionally, U.S. Patent No. 4,452,894 discloses *Pseudomonas putida* (NRRL-B-12,537), *Pseudomonas* sp. (NRRL-B-12,538), *Pseudomonas* sp. (NRRL-B-12,539) and *Pseudomonas aeruginosa* (NRRL-B-12,536). All of the *Pseudomonas* disclosed in U.S. Patent No. 4,452,894 are hereinafter referred to as the "'894 *Pseudomonas*" for clarity. U.S. Patent No. 4,853,334 discloses a process for degrading volatile halogenated aliphatic hydrocarbons containing 1 to 3 carbon atoms using *Pseudomonas fluorescens* (NRRL-B-18,296). U.S. Patent No. 4,910,143 discloses a bacterial method and compositions for degrading hydrocarbons using a mixture of *Pseudomonas putida* (NRRL-B-18,117) and *Pseudomonas putida* (NRRL-B-18,118) at a ratio of 1:100 to 100:1 by cell count. --.

UNITED STATES PATENT AND TRADEMARK OFFICE
CERTIFICATE OF CORRECTION

PATENT NO. : 5,958,241
DATED : September 28, 1999
INVENTOR(S) : DeBenedetto et al.

It is certified that error appears in the above-identified patent and that said Letters Patent is hereby corrected as shown below:

Column 9,
Lines 9 and 10, "group of Pseudomonas identified by reference to the following" should read -- group of (a) '894 *Pseudomonas;* (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count, such *Pseudomonas* identified respectively in the following --;
Line 49, "concentrations of Pseudomonas" should read -- concentrations of the following *Pseudomonas* (a) '894 *Pseudomonas;* (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as Pseudomonas --.

Column 10,
Lines 35 and 36, "microorganisms 15 are selected from Pseudomonas identified by"" should read -- microorganisms 15 are Pseudomonas from (a) '894 *Pseudomonas;* (b) *Pseudomonas fluorescens* (NRRL-B-18,296); and (c) a mixture of *Pseudomonas putida* (NRRL-B-117) and *Pseudomonas putida* (NRRL-B-18,118) at a ratio of 1:100 to 100:1 by cell count as identified by --;
Lines 49 and 50, "selected from Pseudomonas identified by" should read -- selected from (a) '894 *Pseudomonas* (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified by --.

Column 12,
Line 10, "from Pseudomonas identified by" should read -- from (a) '894 *Pseudomonas* (b) *Pseudomonas fluorescens* (NRRL-B-18,296); and (c) a mixture of *Pseudomonas putida* (NRRL-B-18,117) and *Pseudomonas putida* (NRRLB-18,118) at a ratio of 1:100 to 100:1 by cell count as identified by --.
Line 41, "mixture of Pseudomonas disclosed" should read -- mixture of the following Pseudomonas (a) '894 *Pseudomonas (b) Pseudomonas fluorescens* (NRRL-B18,296); and (c) a mixture of *Pseudomonas putida* (NRRL-B-18,117) and *Pseudomonas putida* (NRRL-B-18,118) at a ratio of 1:100 to 100:1 by cell count as disclosed --.
Line 44, "each of said" should read -- each of (a) '894 *Pseudomonas* (b) *Pseudomonas fluorescens* (NRRL-B-18,296) and a mixture of *Pseudomonas putida* (NRRL-B-18,117) and (c) *Pseudomonas putida* (NRRL-B-18,118) at a ratio of 1:100 to 100:1 by cell count as disclosed in said --.

UNITED STATES PATENT AND TRADEMARK OFFICE
CERTIFICATE OF CORRECTION

PATENT NO. : 5,958,241
DATED : September 28, 1999
INVENTOR(S) : DeBenedetto et al.

It is certified that error appears in the above-identified patent and that said Letters Patent is hereby corrected as shown below:

Column 16,
Line 17, "solids, "VSS" volatile" should read -- solids, " VSS" means volatile --.
Line 34, "0.34" should read -- 0.84 --.
Line 66, "16190" should read -- 16890 --.

Column 17,
Lines 31 and 32, "weight, of three different Pseudomonas identified" should read -- weight, of the following different *Pseudomonas* (a) '894 *Pseudomonas;* (b) *Pseudomonas fluorescens* (NRRL-B-18,296); and (c) a mixture of *Pseudomonas putida* (NRRL-B-18,117) and *Pseudomonas putida* (NRRL-B-18,118) at a ratio of 1:100 to 100:1 by cell count as identified --.

Signed and Sealed this

Eighteenth Day of March, 2003

JAMES E. ROGAN
*Director of the United States Patent and Trademark Office*